United States Patent [19]

Drebinger et al.

[11] 3,848,254
[45] Nov. 12, 1974

[54] METHOD FOR LOCATING VEHICLES

[75] Inventors: Klaus Drebinger, Munich; Peer Thilo, Grosshesselohe, both of Germany

[73] Assignee: Siemens Aktiengesellschaft, Berlin and Munich, Germany

[22] Filed: June 14, 1972

[21] Appl. No.: 262,626

[30] Foreign Application Priority Data
July 28, 1971 Germany............................ 2137846

[52] U.S. Cl......................... 343/112 R, 343/112 TC
[51] Int. Cl.............................................. G08g 5/00
[58] Field of Search............................... 343/112 TC

[56] References Cited
UNITED STATES PATENTS

| | | | |
|---|---|---|---|
| 2,972,742 | 2/1961 | Ross............................ | 343/112 TC |
| 3,060,426 | 10/1962 | Williams....................... | 343/112 TC |
| 3,419,865 | 12/1968 | Chisholm...................... | 343/112 TC |
| 3,680,121 | 7/1972 | Anderson et al............. | 343/112 TC |
| 3,714,573 | 1/1973 | Grossman..................... | 343/112 TC |

*Primary Examiner*—Malcolm F. Hubler
*Assistant Examiner*—Richard E. Berger
*Attorney, Agent, or Firm*—Hill, Gross, Simpson, Van Santen, Steadman, Chiara & Simpson

[57] ABSTRACT

A method for locating surface vehicles, particularly in a city area, in which the vehicle to be located transmits a measuring radio signal which is received by at least three differently located radio receiving stations, with the signal values received at each station being conducted, in suitable form, over fixed lines to a central station at which the transit time differences of the measuring signal on its path towards two different receiving stations are determined by means of a phase comparison, with transit time fluctuations occurring in the receiving and transmission devices being compensated by additionally obtained correction values, for example, derived from signals received by the respective receiving stations from a fixed location with known distances from such receiving stations, and evaluating at least two such independent difference values for the determination of the location of the vehicle.

22 Claims, 6 Drawing Figures

METHOD FOR LOCATING VEHICLES

BACKGROUND OF THE INVENTION

The invention is directed to a method for locating surface vehicles, particularly in a city area in which the vehicle to be located transmits a measuring signal, over a radio transmitter, and such signal is received by several differently located radio receiving stations.

It is required, in the rational and effective use of public vehicles, employed in public transportation and other systems, to determine at any given time the position of each individual vehicle, as exactly as possible. It is particularly important, to continuously ascertain the location of police and emergency vehicles in order to be able to provide help both rapidly and effectively. It is therefore particularly desirable that the central or main office be able at any time to determine and recognize which vehicle is the shortest distance from a place of action of which vehicle can reach such place of action in the shortest time. In an effort to meet these requirements, such vehicles, as well as many public transportation vehicles, are usually equipped with radio telephone systems by means of which the individual drivers can contact the central office at any time and report their vehicle location. Such locating over radio telephone, however, not only takes considerable time, but also requires considerable personnel in the main office as well as in the vehicles. It will be apparent that with a fairly large number of vehicles a continuous control of all vehicles in this manner is not possible.

Another system for locating vehicles, which for example, is described in U.S. Letters Patent Nos. 2,597,517 and 2,790,071 utilizes a fairly large number of signal devices which are permanently installed along the routes used by the vehicles. Thus when a vehicle passes the signal device, the code data of the identified vehicle, along with the location code of the permanently installed signal devices are transmitted to the main office over fixed lines or by radio. It will be appreciated that the greater the number of signal devices employed the more exact the paths of each vehicle can be monitored. However, as the vehicle must always pass close to the signal devices involved, this system, from a practical standpoint, is useful only for vehicles with predetermined fixed routes, and thus in particular for buses and rail vehicles. As a result it is utilized primarily in railroad systems.

In another system, a radar method has been suggested for locating vehicles, in which a directional antenna positioned in the center of the area to be monitored rotates slowly around a vertical axis. A modulated transmission signal is transmitted which, upon receipt by the vehicle antennas respectively positioned within the directional beam, results in the transmission of a secondary signal from the vehicle along with a vehicle recognition signal or code. Such secondary signal is received in the main office where the respective vehicle location is obtained from the recognition signal, the angular position of the antenna and the signal transit time. However, as relatively short waves must be used as the carrier frequency in order to maintain the dimensions of the directional antenna sufficiently small, which is a particular disadvantage of this type of system. Likewise, such short waves may be sufficiently shielded by buildings and other objects that an adequate recognition and location of the vehicles cannot be reliably assured, particularly in city areas.

The high probability of faults occurring in the previously mentioned systems due to the possibility of a number of reflections, etc. is at least partially compensated by a method disclosed in German Offenlegungsschrift 2,032,211, by the utilization of several receiving stations. The central area defined by the fault probability values is obtained from several independent distance measurements and the actual vehicle position is approximated as a limit with respect to the central area. In this system, an electrical reference signal is transmitted from a transmitter and a response from the vehicle to be located is returned with or without a known delay. Such return signal is recorded by at least three receivers and compared with the reference signal which has also been received. The location of the vehicle is derived from the time difference of the two signals. Thus, the transit times of transmitter-to-vehicle-to-receiver and transmitter-to-receiver of this prior art system are compared with each other, with such comparisons taking place at the individual receivers. However, with this arrangement expensive data channels are required between the receivers and the main office. A further disadvantage of this method resides in the fact that the signal at the vehicle, and determination of the transit time must be further processed and determined at the receiving stations with the greatest absolute exactness and consistency. Consequently, each individual vehicle must be equipped with an expensive, special receiver, providing minimum phase distortion in the measuring frequency.

The invention is therefore directed to the utilization of a method of the type initially mentioned, employing several individual receiving stations and permitting a very exact determination of location while employing very simple and inexpensive equipment in the vehicles.

BRIEF SUMMARY OF THE INVENTION

The desired results are achieved in the present invention by the utilization of at least three receiving stations at each of which a measuring signal is received from the vehicle, which signals, in suitable form, are transmitted to a common central or main station or office over fixed lines or cables whereby there may be determined at the central station, by means of a phase comparison, the transit time difference of the measuring signal on its path to two respective receiving stations, and by suitable evaluation, for example, in an evaluation device, of at least two such mutually independent difference values, the location of the vehicle may be determined. Transit time fluctuations occurring in the receiving and transmission devices may be compensated by means of additionally obtained correction values. It will be appreciated that the efficiency of a vehicle locating method is primarily determined by the exactness with which the actual location is obtained. In this connection the problem of transit times in the receiving devices and on the cables between the receiving stations and the main office presents an additional problem in connection with the technical realization of the method here involved. Obviously, a compensation of such transit times by means of an equalizing or balancing is not possible since a constant transit time fault cannot be assumed to exist over a fairly long period of time. Transit time fluctuations, for example, resulting from temperature changes, however, can materially impair the exactness of the measuring results. The desired compensation is provided in the present invention by the utilization of a fixed comparison transmitter with exactly known coordinates which is likewise located at certain time intervals with respect to the receiving stations in a manner generally corresponding to a mobile vehicle transmitter. As the distances of the comparison transmitter to the receiving stations is accurately known, and thus also the transit times of the signals between such transmitter and the receiving stations, correction values for transit time distortions can be obtained from comparison measurements.

The measuring signal from a vehicle will, in dependence on the distance of the individual receiving stations from the vehicle, be received at the respective receiving stations with different phase relationships. It will be particularly noted however, that in the practice of the present method, the differences between the respective transit times or the distances are measured and not the absolute transit time between vehicle and receiving stations. The geometric location of all points for which the difference of the distances from two fixed focal points is constant is a Consequently Conseqeuntly a hyperbola with two receiving stations as the respective focal points can be obtained by means of a phase difference measurement and such hyperbola will intersect the location of the vehicle which is to be located. A second phase difference measurement, employing another receiving station enables the derivation of a second hyperbola with the desired location of the vehicle being at the intersection of the two hyperbolas. As absolute transit times or distances are not measured with the method of the present invention, the transmission of a guide or reference frequency by the main or central office becomes superfluous. The vehicle to be located independently transmits the measuring frequency which is positioned in the audio frequency range, for example at 3kHz, and can be readily transmitted over radio telephone equipment which is commercially procurable and customarily installed in vehicles of the type involved. Advantageously, the low frequency measuring signal is transmitted as a modulation on a high frequency carrier. As a result, antennas of small dimensions and a narrow-band radio channel requiring low power may be utilized. The measuring signal can then be demodulated at the respective receiving stations and conducted to the main office over low-frequency connection lines or cables.

Advantageously, the measuring signals transmitted from the individual vehicles is effected under the control of command signals from the main office. Consequently, it can be reliably guaranteed that the measuring signals received at the main office are associated with a selected vehicle. The command signals from the main office can be transmitted by the employment of a multi-frequency code or with a time multiplex system so that only one selected vehicle will respond to the command and transmit the desired measuring signal. However, it is also possible to simultaneously transmit the command signal to a group of vehicles with the vehicles in such group transmitting the measuring signal by means of a cyclic response in a fixed predetermined succession. Such a group response requires less time than individual interrogations of an equal number of vehicles since the time for a command signal and an answer signal is not required for each vehicle. Thus, only the time for a single command signal is utilized and all answering signals can be transmitted in the fixed succession directly following one upon the other.

It is also possible to provide that each vehicle transmits an identification signal, along with the measuring signal and even additional messages such as emergency calls or messages about the state of the vehicle, etc., can be transmitted by means of further signals with or along with the measuring signal.

It is also possible to employ amplitude limiting, for example by the use of limiting amplifiers, to reduce transit time distortions due to level fluctuations at the receiving stations. Likewise, in order to avoid transit time fluctuations due to the use of intermediate frequency filters in the individual receiving stations suitable control of the local oscillator may be provided whereby a constant intermediate frequency results even during frequency deviations at the transmitter.

A further improvement in the exactness of measurements can be achieved with the method of the present invention by receiving and evaluating more than one measuring signal for each location. Thereby, in particular, the possibility of faults resulting from the reflections and shielding of the measuring signal in a city due to buildings and other objects is reduced. Likewise, the utilization of more than three receiving stations may be particularly advantageous whereby additional information is derived for ascertaining the exact location.

It may also be advantageous in connection with the evaluation of the received measuring signals to initially exclude interfered signals. For example, during the evaluation of the multiple measurement in which, as above mentioned, a fairly large number of measuring results are obtained either by several receiving stations or by measurement of several signals, the probable location can be determined, for example, by utilization of an average value of all measurements. However, it is advantageous to omit measuring values which clearly are out of line, i.e., not representative, for the computation of the average.

Another possibility for ascertaining the most probable location resides in the utilization of the shortest transit times of several successively received measuring signals, by means of a comparison with a central time base and utilizing only these shortest transit times for the hyperbolalocating method according to the invention, proceeding upon the assumption that such shortest transit times are always subject to the least detours due to reflections, etc. It will be apparent from the above that continuous vehicle locating may be achieved with the present invention by a suitable succession of measurements at predetermined time intervals. Likewise, from such a succession of individual location determinations, the path of the vehicle involved can be traced without difficulty, for example with the help of a street map or the like. The exactness of the measurement can also be increased by comparing each determined location with the preceding location and only considering it when the distance of the two measured points coincides with the speed the vehicle might reach, while taking into account general conditions such as street directions, rivers, bridges and similar items.

As has been previously mentioned, the exactness of the location is materially increased by utilization of multiple measurements. This is primarily due to the fact that the reflection of the measuring signal is continuously changing with the movement of the vehicle, so that faults occurring tend to compensate each other. However, such compensation does not occur when the vehicle is stationary as the same fault will continuously effect a multiple measurement in the same direction. Thus, in a further development of the method of the present invention, the evaluation of the measuring signals is effected only with respect to moving vehicles, utilizing suitable means. The status of a vehicle as to it being stationary or moving may be obtained, for example, by means of a comparison of fluctuation magnitudes and fuctuation frequencies of the values obtained during a measurement. However, it is also possible to indicate the fact that a vehicle has stopped by the superimposition of a special signal on the measuring signal, utilizing suitable equipment on the vehicle. Likewise, the vehicles may also be so equipped that the associated transmitter can be operable to transmit a measuring signal only when the vehicle is in motion.

It is also particularly advantageous in the practice of the present invention, in connection with multiple measurements, etc., that a suitable electronic computing system be employed in the central office for determining and evaluating the respective measurement values, and by means of which it is possible to continuously monitor the respective locations with great exactness by the utilization of frequent interrogation and evaluation of a larger number of measuring signals.

In order to achieve a favorable utilization distance relative to interference, during the reception of the measuring signals, it may in many cases be desirable to provide the respective receiving stations with directional antennas, in which case the respective receiving stations should be placed at the outer edge of the area which is to be monitored so that by means of such directional antennas they can cover the entire area.

The evaluation of the measuring values obtained according to the method of the invention may be effected in a particularly advantageous manner in such a way that the positional information of the respective vehicle is represented on a television monitor, along with several characterizing magnitudes of the status of the respective vehicle, which television monitor may simultaneously portray a city map or the like. Likewise, a colored identification of the individual vehicles is particularly advantageous. In lieu of a television monitor, it is also possible to indicate the individual vehicle locations as respective light dots on a picture screen surface, such as a city map, utilizing a suitable projector therefor.

BRIEF DESCRIPTION OF THE DRAWINGS

In the drawings, wherein like reference characters indicate like or corresponding parts.

DETAILED DESCRIPTION OF PREFERRED EMBODIMENTS OF THE INVENTION

Figure 1:
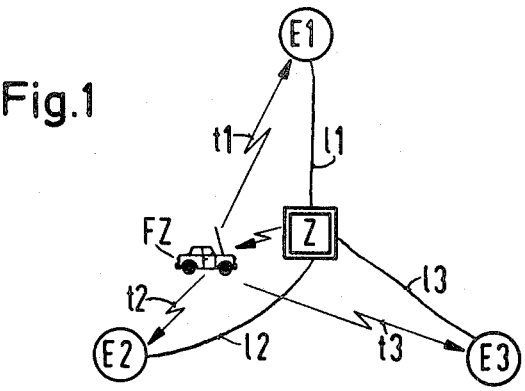
FIG. 1 diagrammatically illustrates the basic arrangement of the receiving stations and the central office relative to a vehicle in the practice of the present invention.

Referring to the drawings and more particularly to FIG. 1, which illustrates a geographic arrangement of individual devices which may be utilized in practicing the method of locating a vehicle in accordance with the present invention, E1, E2 and E3 designate respective individual stationary radio receiving stations, adapted to receive transmissions from a vehicle FZ moving in the monitored area. The respective radio receiving stations are operatively connected over fixed lines or cables 11, 12 and 13 with the central or main office Z which is provided with a transmitter adapted to transmit a control signal operative to cause the selected moving vehicle to transmit a low frequency measuring signal. Such signal is nondirectionally transmitted and received by the three stationary receiving stations E1, E2 and E3. Depending upon the location of the vehicle, such measuring signal will require different transit times t1, t2 and t3 to reach the individual receiving stations, and consequently will be there received with different phase shifts. The low frequency measuring signal emitted by the vehicle is transmitted by means of a high carrier frequency on which the signal is modulated and, following receipt at the respective receiving stations, the low frequency signal is obtained by demodulation thereat and further processed to the main office Z over fixed cables or lines 11, 12 and 13 having known transit times. The time differences between the transit times $t1$, $t2$ and $t3$ may then be obtained by means of a phase comparison. Utilizing such difference values, hyperbolas between two respective receiving stations can be derived, and from their intersection the location of the vehicle determined.

Figure 2:
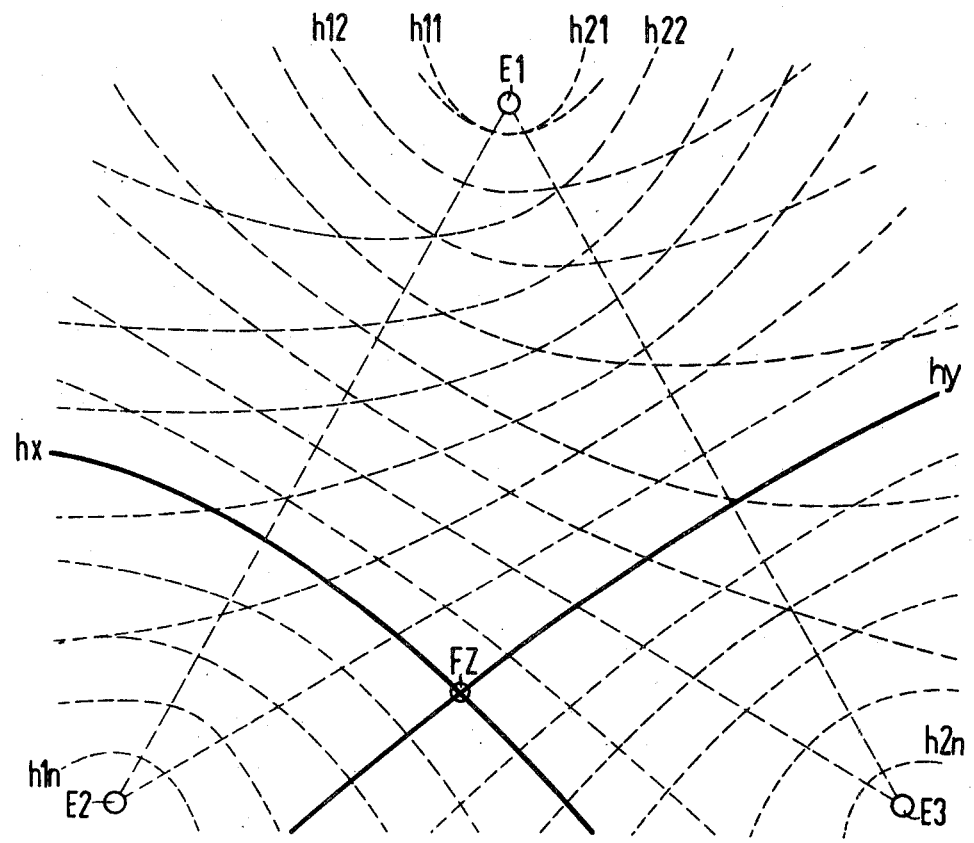
FIG. 2 is a diagram of three receiving stations, illustrating the hyperbolic location in accordance with the present invention.

The locating of a vehicle by means of hyperbolas is generally illustrated in FIG. 2. Considering the two points E1 and E2, a plurality of hyperbolas $h11$, $h12$ . . . $h1n$ can be formed between these two points, each of which has the two points E1 and E2 as focal points. Each hyperbola thereby represents the geometric locations for all points from which the difference of the distances to the two points E1 and E2 are equal. Thus assuming that the measuring signal of the vehicle FZ has a transit time t1 to the receiving station E1 and the transit time $t2$ to the receiving station E2 such vehicle must be located somewhere along the hyperbola $hx$ corresponding to the transit time difference t2 − t1.

In like manner hyperbolas $h21$, $h22$ . . . $h2n$ can be formed between the receiving stations E1 and E3 in correspondence to the difference in distance between the two receiving stations. Again, a single hyperbola, hy corresponds to the specific transit time difference $t3 − t1$. Consequently, the intersection of the two hyperbolas hx and hy defines the desired location of the vehicle. While it is, of course, possible to form hyperbolas in the same manner between points E2 and E3 no additional information would be derived therefrom. However, depending on the type of evaluation, it may be advantageous as a practical matter, in the computations, to select from the three possible hyperbolas, those two hyperbolas which intersect as close to the vertical as possible, in order to avoid more or less overlapping intersections and thus an inexact reading. The utilization of a fourth receiving station likewise would provide additional intersections which can be used for example, for determining a center area as an approximated location.

Figure 3:
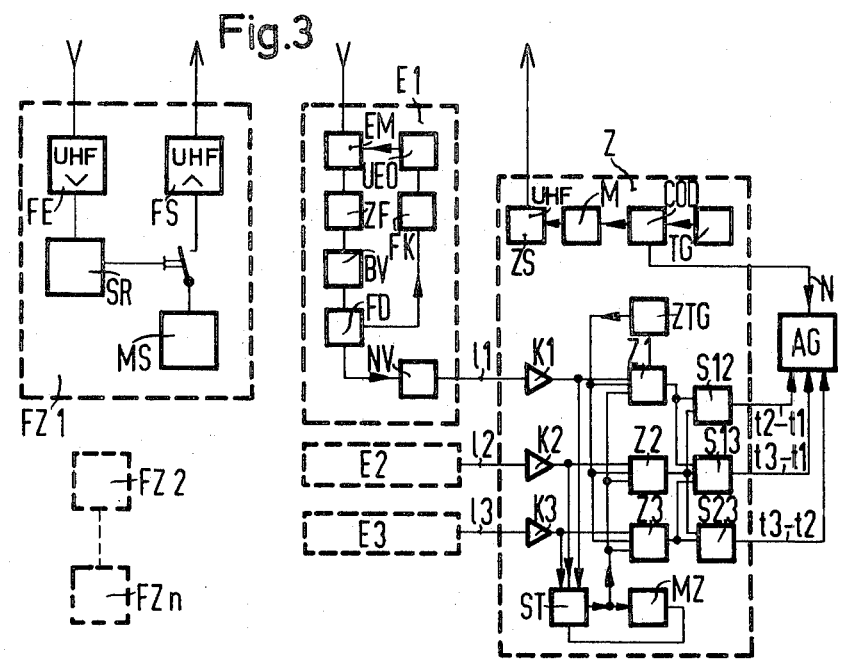
FIG. 3 is a block diagram generally illustrating the devices associated with a vehicle, a receiving station and the central or main office.

FIG. 3 illustrates the most important component devices employed in practicing the locating method according to the invention, and illustrates in block diagram the respective components associated with a vehicle FZ 1 a receiving station E1 and a main office Z. As the vehicle FZ1 is provided with merely a few additional simple devices, the method of the invention can be utilized for a large number of vehicles at a comparatively low expense. Each vehicle contains a measuring sound transmitter MS which provides a measuring signal of audio frequency which is modulated onto a high frequency carrier and radio transmitted over the vehicle radio transmitter FS. The command for initiating the measuring signal is obtained at the vehicle, from the main office, over the vehicle receiver FE with a selective call receiver SR being responsive only to a certain predetermined command signal, and which, upon receipt thereof, operatively connects the measuring sound transmitter MS to the transmitter FS for a short period. All remaining vehicles FZ2 through FZn are provided with the same type of equipment as the vehicle FZ1 with the exception that the call receivers SR each are responsive to a different command signal.

The arriving radio signal is received in the receiving station E1 and is transformed in the receiver mixer EM to an intermediate frequency which can be more simply processed. The signal is then conducted to a broadband limiting amplifier BV over an intermediate frequency filter ZF, following which the signal is evaluated in a frequency discriminator FD and is then conducted to a low frequency amplifier NV and conducted therefrom over the line 11 which may comprise a low frequency cable having a known transit time. At the same time the arriving frequency will be measured and maintained constant over an automatic frequency control FK and the mixer oscillator UEO, under the control of the discriminator FD.

Simultaneously with these operations, the measuring signal will be received at the other receiving stations E2 and E3, having the same devices as the station E1, such received signals having different transit times, in correspondence upon the relative position of the vehicle, such signals being similarly processed and conducted to the main office Z. The main office contains the devices necessary for calling any of the vehicles which are subject to being located, and for such purpose a coder COD is provided, under the control of a timer TG (defining respective timing periods), with the coder emitting the selecter command signal which is conducted to the high frequency transmitter ZF over the modulator M. The command signals for effecting transmission of the measuring signal from the vehicle is thus transmitted to the vehicle to be located over such transmitter.

The main office also contains the devices for measuring the transit time of the respective signals, which may be effected with digital counters Z1, Z2 and Z3, preferably over several periods to provide an average and thereby reduce the affect of short-time transmission interferences, multiple reflections and faults due to noise (noise superimposed on the signal). Each receiving station thus has associated therewith a respective counter. The derivation of the transit times or transit time differences is effected through a phase comparison with the zero passage being evaluated for such phase measurement. Each measuring signal arriving from a respective receiving station E1, E2 or E3 is conducted to a corresponding comparator K1, K2 or K3 whose outputs are switched through at exactly the zero passage. Since the zero passage of the signal may shift due to distortions, it may be advantageous to insert a filter (not illustrated) preceding the other devices. All counters Z1, Z2 and Z3 are started at the same instant by a start impulse generator ST and are supplied with counting impulses from the timing generator ZTG. As only the difference of the counter contents is utilized during the evaluation of the measuring signals, it will be sufficient to start the counters at each period at any instant, merely insuring that all counters start at the same instant. However, the counter capacity must be larger when the counters are started earlier within the periods of the measuring frequencies. As a result, advantageously these counters will be started at the latest possible instant, i.e., during the first zero passage of a signal. The individual counters are then stopped by the comparator associated therewith when the associated signal passes zero. Consequently, the counter of the first received signal remains at zero. The individual counting pulses are likewise received in a counter MZ which terminates the measuring process when a certain value is reached in such counter.

Figure 4:
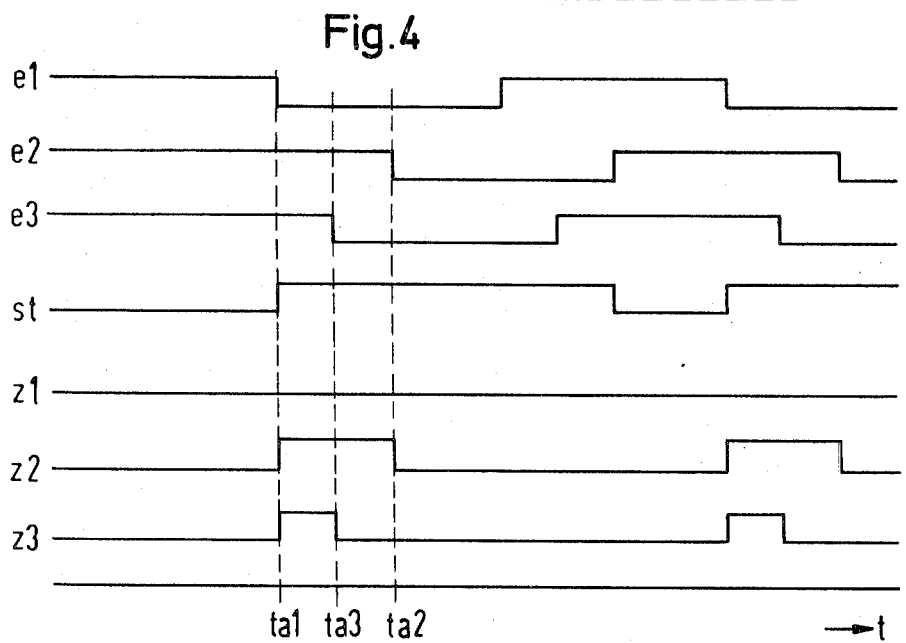
FIG. 4 is a chart illustrating the principle of the transit time difference measurements.

FIG. 4 illustrates the course of the phase difference measurements with respect to time. The signals $e1$, $e2$ and $e3$, which arrive from the receiving stations E1, E2 and E3 pass the zero point at different time instants, $ta1$, $ta2$ and $ta3$. At the instant $ta1$, all meters Z1, Z2 and Z3 are started by the starting signal $st$. The counter Z1, however, is stopped immediately by the zero passage of the measuring signal $e1$, so that such counter measures a time difference of "zero." The counter Z2 is stopped during the zero passage of the measuring signal $e2$ at the time $ta2$ and thus represents a time difference of $z2 = ta2 - ta1$. Correspondingly, the counter Z3 is stopped at the instant $t3$ whereby its time difference amounts to $z3 = ta3 - ta1$. The counting process can, of course, be started at any desired instant. The differences in count of the individual counters are thus formed by the subtractors S12, S13 and S23 (FIG. 3), and are conducted to an indicating device AG. Simultaneously, such indicating device obtains the code of the vehicle from the coder COD for example, the vehicle numbered N. Thus the respective vehicle, along with its location and its identification may appear on a picture screen.

Figure 5:
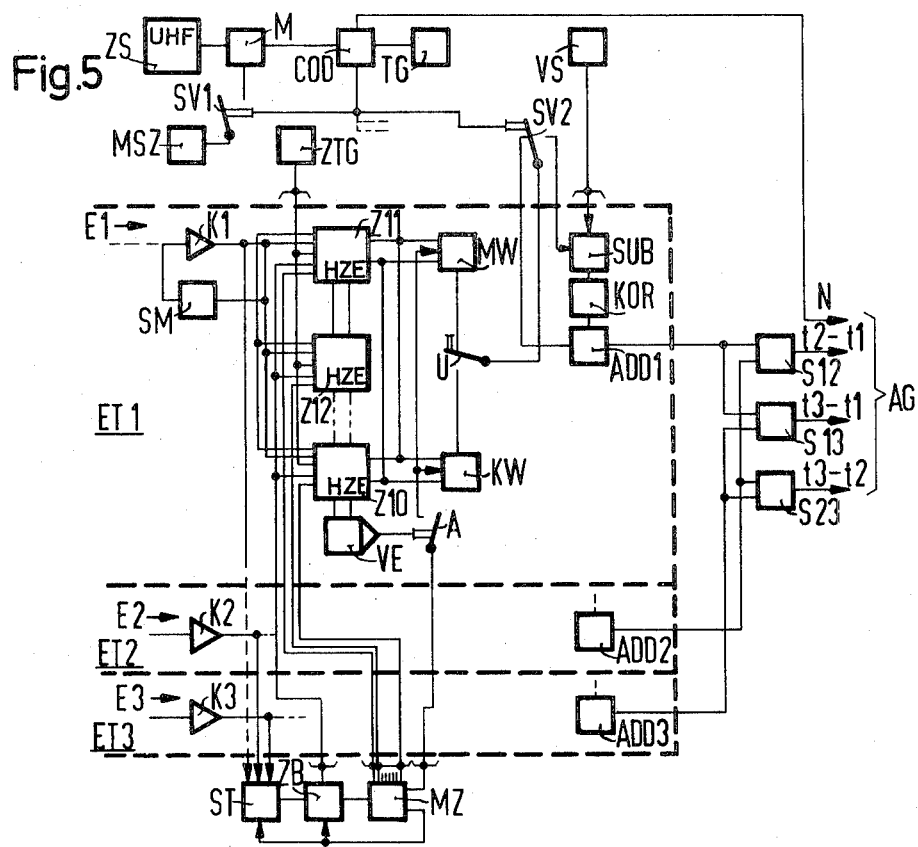
FIG. 5 is a block diagram of a central office, illustrating a number of additional devices for compensating faults.

FIG. 5 illustrates the general circuit of FIG. 3 with respect to the main office but illustrating additional devices to provide for fault correction and an increase in the accuracy of the measuring process, as compared with the circuit of FIG. 3. It will be apparent that some of the devices are central devices, present only singly, while others are present in each receiver section ET1, ET2 and ET3, and are thus present in a number dependent upon the number of receiving stations. Of these additional devices, only that of the receiver section ET1 is illustrated in detail. Each receiver section such as the section ET1 contains a relatively large number of counters instead of only a single counter, for example Z11, Z12 ... Z10, which are successively connected by the measuring process counter MZ, so that each counter produces an individual measurement. An interference-ascertaining device SM is associated with each comparator K1, K2 or K3 which respectively cancels the partial measurement involved in the presence of a received signal which has been subjected to interference. In the absence of interference, the count proceeds as described in connection with FIG. 3, whereby each counting process is initiated by the central starting impulse generator ST. The individual counters Z11 through Z10 are all connected to a common comparing device VE which is operative to compare the counted results with one another. If all the results are equal, at least up to their hundred or ten digit, the position of the vehicle is obtained therefrom with a further evaluation of the measuring operation being prevented by the switch off device A. Consequently, a switch over device U is provided which can selectively operatively connect the average value generator MW or the shortest value generator KW. However, in order to obtain the shortest measured value, it will be required to associate a center time base with the counter. This is effected over a center measuring sound transmitter ZB which is synchronized with an arriving signal during the first individual measurement. With the following individual measurements, no starting signal is transmitted as a result of an arriving signal from a receiving station, but as such central measuring sound transmitter ZB has substantially no transit time, it thus always triggers the measuring processes at the same time interval. From a comparison of the resulting partial measurements, the respectively shortest transit time of the entire measuring process can be recognized without difficulty.

The value obtained from a measuring process, either by means of average formation or by means of ascertainment of the value of the absolutely shortest transit time, is finally supplied to an adding device ADD1 and there supplemented by a correction value from a correction memory KOR which provides compensation for transit time fluctuations in the evaluation and transmission devices. The resulting value from such adder ADD1 is then supplied to the subtracting devices S12, S13 and S23, along with the values from the adders ADD2 and ADD3 of the remaining receiver sections. The coordinates obtained therefrom are then utilized for control of the indicating device, together with the vehicle identification number from the coder COD.

The correction values of the correction memory KOR are obtained from a comparison measurement with a stationary comparison transmitter MSZ. For this purpose, the coder COD will from time to time call the comparing transmitter MSZ instead of a vehicle, and will cause it to transmit a measuring signal over a switch SV1. Such comparison transmitter MSZ, which preferably is located in the main office, corresponds in construction exactly to that of the measuring sound transmitters MS of the individual vehicles. The switch SV2 is actuated simultaneously with the call of the comparison transmitter, so that the measuring result is not extended the adding device DD1 but to a subtracting device SUB, wherein the measuring value of the comparison transmitter is compared with the actual coordinates stored in a fixed-value (read-only) memory VS which have likewise been supplied to the subtracting device SUB. From such comparison of the actual coordinates with the measured values, a correction value is obtained which is stored in the correction memory KOR and which will be taken into account in the remaining measurements.

Figure 6:
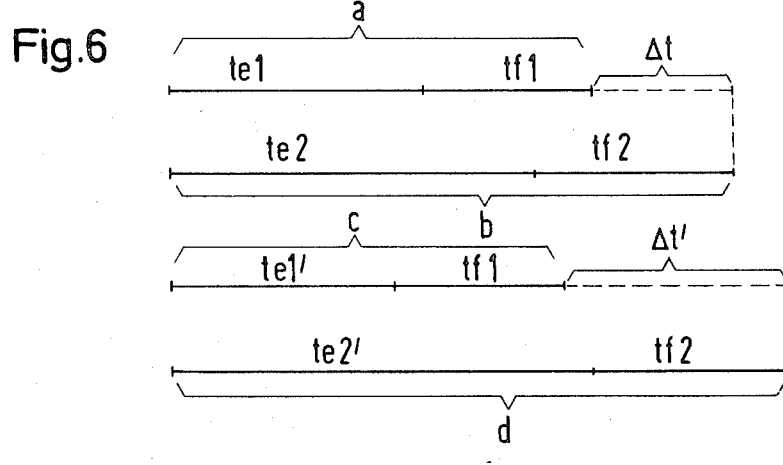
FIG. 6 is a charge illustrating the manner in which correction values may be derived, utilizing a comparison transmitter.

The manner in which transit time distortions may be determined with the utilization of the comparison transmitter will be more readily understood in connection with FIG. 6. The comparison transmitter is operationally located in the same manner as a movable vehicle transmitter, but as the distances to the respective receiving stations are, in this case, known exactly, the transit times of signals between the comparison transmitter and receiving stations are likewise known exactly. Thus, in FIG. 6, the letter $a$ represents the entire transit time from a vehicle to the main office over a receiving station E1, the letter $b$ designates the entire transit time from the same vehicle to the main office over the receiving station E2 and in like manner the letter $c$ refers to the entire transit time from the comparison transmitter to the main office over the receiving station E1, and the letter $d$ the entire transit time from the comparison transmitter to the main office over the receiving station E2. In this case $te1$ and $te2$ represent the transit times during the locating operation from the vehicle to the respective receiving stations and $te1'$ and $te2'$ represent the corresponding transit times from the comparison transmitter to the receiving stations. The transit time delays in the receiving station and in the lines or cables are thus denoted by $tf1$ and $tf2$ and are equal with respect to the comparison measurement and the vehicle locating measurements.

$\Delta t$ or $\Delta t'$, respectively represent the faulty transit time differences. Thus the following is valid:

$$\Delta t = (te2 + tf2) - (te1 + tf1).$$

Reformation thereof will result in the following:

$$te2 - te1 = \Delta t - (tf2 - tf1).$$

Consequently $te2 - te1$ represents the desired difference of the true transit times. $tf2 - tf1$ is obtained during the comparison measurement as follows:

$$\Delta t' = (te2' + tf2) - (te1' + tf1)$$

which becomes $tf2 - tf1 = \Delta t' - te2' - te1' = k$.

$k$ is thus the correction value by means of which each measurement is corrected. It thus is the difference of the real transit time $te2 - te1 = \Delta t - k$. In this manner, the exactness of the transit time measurement does not enter into the result absolutely, but only the exactness in relation to the comparison measurement.

It will be appreciated that the present invention may be practiced with known and readily procurable commercial devices, with respect to both the vehicle and receiving station installations as well as that of the main office, and consequently, FIGS. 3 and 5 merely illustrate the respective devices in block form.

It is believed apparent, however, that the measuring sound transmitter MS may be of exceedingly simple construction, comprising a suitable resonant circuit and associated transistor operable to produce a suitable signal.

Likewise, the selective call receiver SR may be of relatively simple construction including a transitor and resonant circuit whereby the circuit is responsive to an incoming signal of predetermined frequency, as determined by the resonant circuit, with the transistor being adapted to actuate a suitable relay for connecting the transmitter MS to the vehicle transmitter FS for the duration of the command signal. The coding device likewise may be of the "tone" type employing difference identifying frequencies, each of which is adapted to actuate a respective call receiver.

Likewise, the starting impulse generator ST may, for example, be designed in the form of a mixing gate whereby a signal from any receiving station will result in a signal in the output which will simultaneously start all of the cooperable counters. Similarly, the interference determining circuit SM may, for example, by designed as a noise barrier, including a resonant circuit tuned to the measuring signal frequency and which will not allow the passage of any signal to reach the counters in the presence of other frequencies. The comparison device VE may, for example, consist of exclusive-OR gates while the memory KOR can, for example, be constructed in the form of an electronic flip-flop memory.

The receiver EM may be of any suitable construction as generally indicated in block form, and utilizing known frequency control techniques.

It will be appreciated from the above description that the method of the present invention may be readily practiced with the use of relatively very simple equipment, all of which involves standard design techniques and common circuitry with the respective devices being readily procurable. Consequently, it will be appreciated that the present invention does not involve details of construction of individual devices, but in the specific method herein described.

Having thus described our invention, it will be apparent from the above description that various immaterial modifications may be made in the same without departing from the spirit and scope of the invention.

We claim as our invention:

1. A method for locating surface vehicles, particularly in a city area, in which the vehicle to be located transmits a measuring radio signal which is received by a plurality of differently located radio receiving stations, comprising the steps of transmitting from such vehicle, for each location operation, a plurality of measuring signals of relatively low frequency, modulated on a relatively high frequency carrier, receiving such measuring signals by a plurality of receiving stations, greater in number than the minimum number required to define a location, demodulating the received signals in the respective receiving stations, conducting the demodulated signals over respective fixed, corresponding low frequency lines to a central station, deriving correction values by similarly transmitting like measuring signals from a fixed location with known distances to the respective receiving stations, transmitting the corresponding demodulated low frequency signals from the respective receiving stations to the central station, utilizing thereat corrections derived therefrom to effect corrections in transmission of the corresponding demodulated signals between the central and receiving stations, utilizing the average of a plurality of received corresponding low frequency signals from the respective receiving stations to determine, in the central station by means of a phase comparison, respective transit time differences of the measuring signal on its path towards respective different pairs of receiving stations, and effecting an electronic computation to drive a location-defining point by hyperbolic intersection, thereby determining the location of the vehicle.

2. A method according to claim 1, comprising the step of initiating transmission of a measuring signal from the vehicle transmitter by transmission of a command signal from the central station.

3. A method according to claim 2 wherein the command signal employs a multi-frequency code whereby it is operatively received by only a selected vehicle.

4. A method according to claim 2 wherein the command signal is time-multiplexed whereby it is operatively received by only a selected vehicle.

5. A method according to claim 2 wherein the command signal is simultaneously transmitted to a group of vehicles and the vehicles of such group transmit their respective measuring signals in a fixed succession by means of a cyclic interrogation.

6. A method according to claim 1, wherein each vehicle transmits an identification signal simultaneously with the measuring signal.

7. A method according to claim 1, wherein additional information is transmitted by means of further signals, with or separate from the measuring signal.

8. A method according to claim 1, wherein broad band limiting is employed to reduce transit time distortions due to level fluctuations at the receiving stations.

9. A method according to claim 1, wherein a constant intermediate frequency is formed at the high frequency receivers of the receiving stations, and controlling the local mixing frequency in the presence of frequency deviations in the transmission from a vehicle.

10. A method according to claim 1, comprising the step of excluding from evaluation measuring signals which involve interference distortions.

11. A method according to claim 1 wherein corresponding measuring values are relatively far apart and not taken into account in the formation of an average value.

12. A method according to claim 1, wherein the respective shortest transit times from several successively received measuring signals, are derived from a comparison with a central time basis and utilized for the location determination.

13. A method according to claim 1, comprising the steps of comparing each determined location of a vehicle with the preceding location determination thereof and taking the same into account only when the distance of the two measuring points are consistent with the maximum driving speed of the vehicle.

14. A method according to claim 1, wherein the evaluation of measuring signals is effected only with vehicles which have changed their positions.

15. A method according to claim 14, wherein a differentiation between stationary and moved vehicles is effected by a comparison of the fluctuation magnitude and fluctuation frequencies of the values obtained during a measurement.

16. A method according to claim 14, wherein stationary vehicles are indicated by a particular signal transmitted with the measuring signal.

17. A method according to claim 14, wherein a transmission of a measuring signal from a vehicle is effected only during movement of the vehicle.

18. A method according to claim 1, wherein directional reception is utilized at the receiving stations.

19. A method according to claim 1, comprising the step of reproducing the individual vehicle location on a television monitor.

20. A method according to claim 1, comprising the step of representing the individual vehicle locations by projecting respective identifying light dots on a picture surface.

21. A method according to claim 18, comprising representing the individual vehicles by light dots of different colors.

22. A method according to claim 19, comprising representing the individual vehicles by light dots of different colors.

* * * * *